G. DINKEL.
AUTOMATIC FUEL FEED MECHANISM FOR FURNACES.
APPLICATION FILED NOV. 9, 1908.

970,432.

Patented Sept. 13, 1910.
7 SHEETS—SHEET 1.

Witnesses:
D. W. Gardner.
G. W. Hopkins.

Inventor:
George Dinkel
By his Attorney
Geo. Wm. Miatt

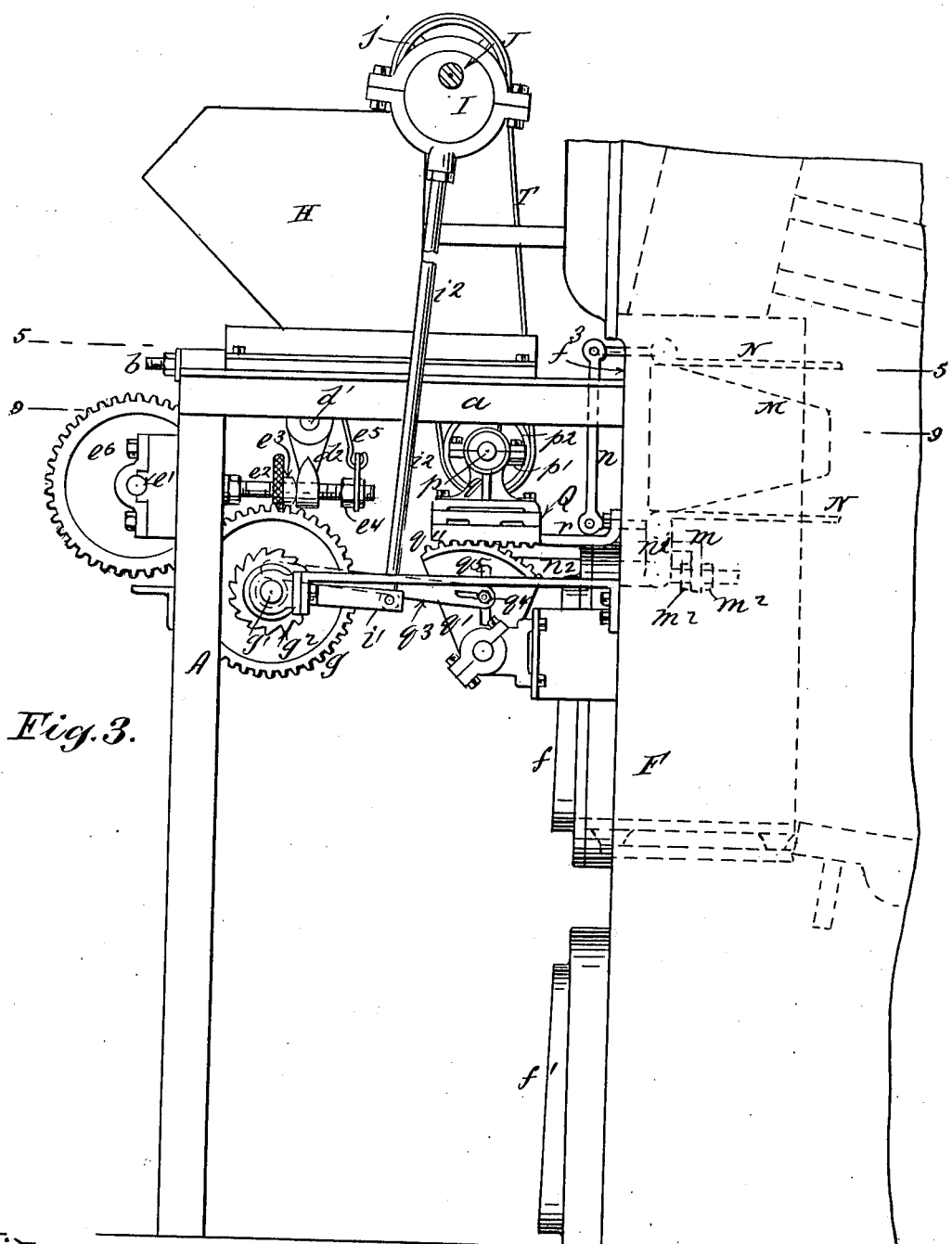

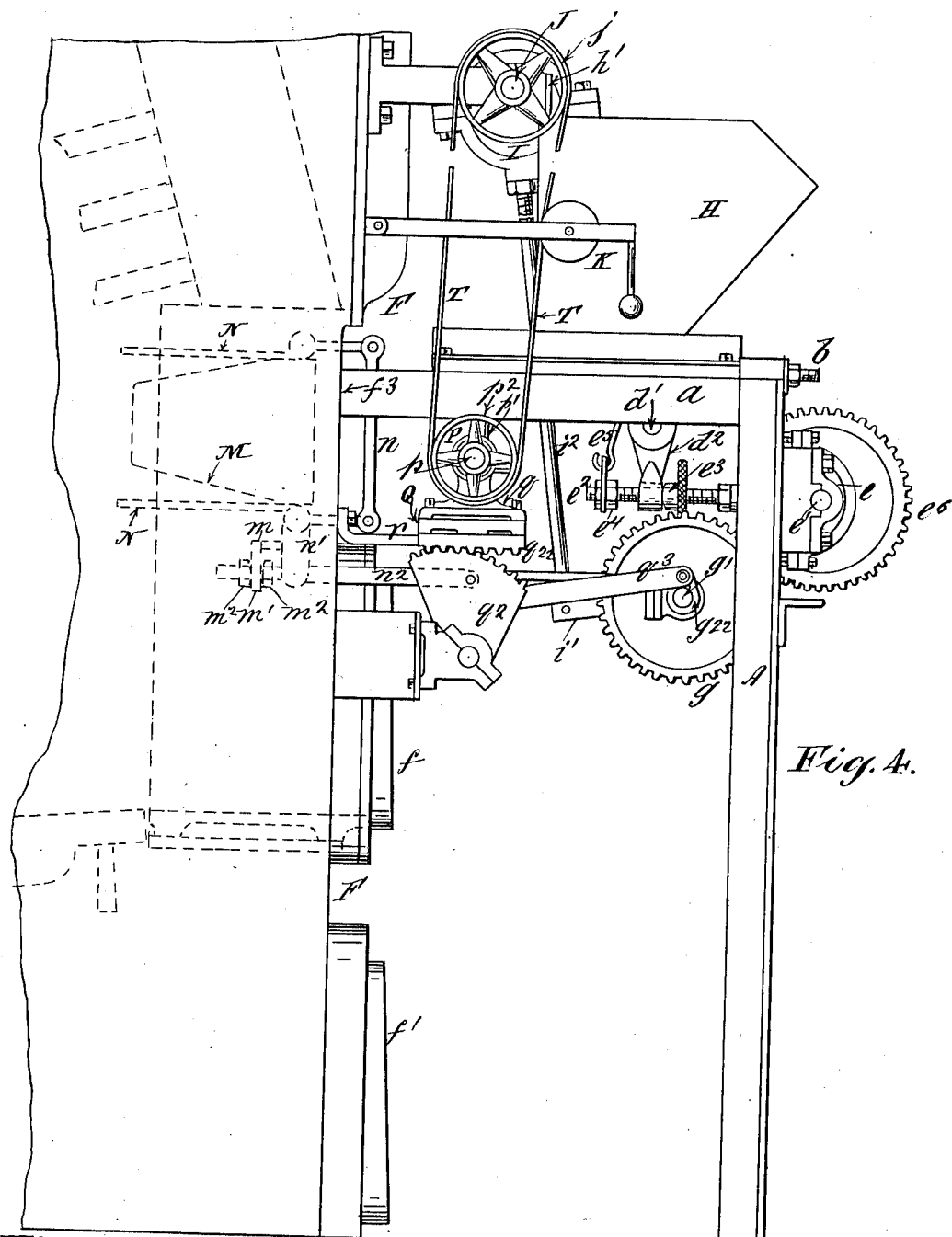

G. DINKEL.
AUTOMATIC FUEL FEED MECHANISM FOR FURNACES.
APPLICATION FILED NOV. 9, 1908.
970,432.
Patented Sept. 13, 1910.
7 SHEETS—SHEET 5.
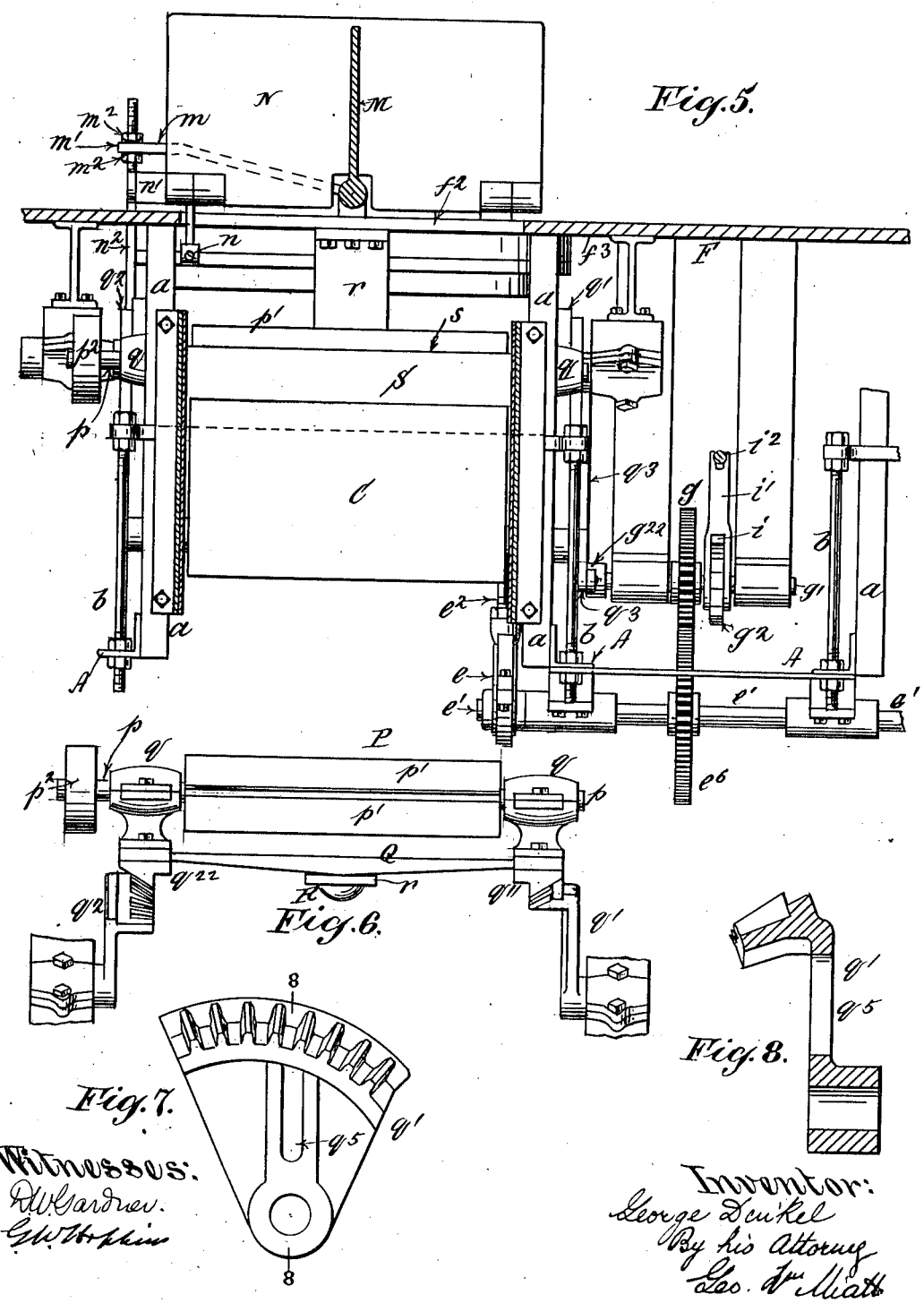

G. DINKEL.
AUTOMATIC FUEL FEED MECHANISM FOR FURNACES.
APPLICATION FILED NOV. 9, 1908.
970,432.
Patented Sept. 13, 1910.
7 SHEETS—SHEET 6.
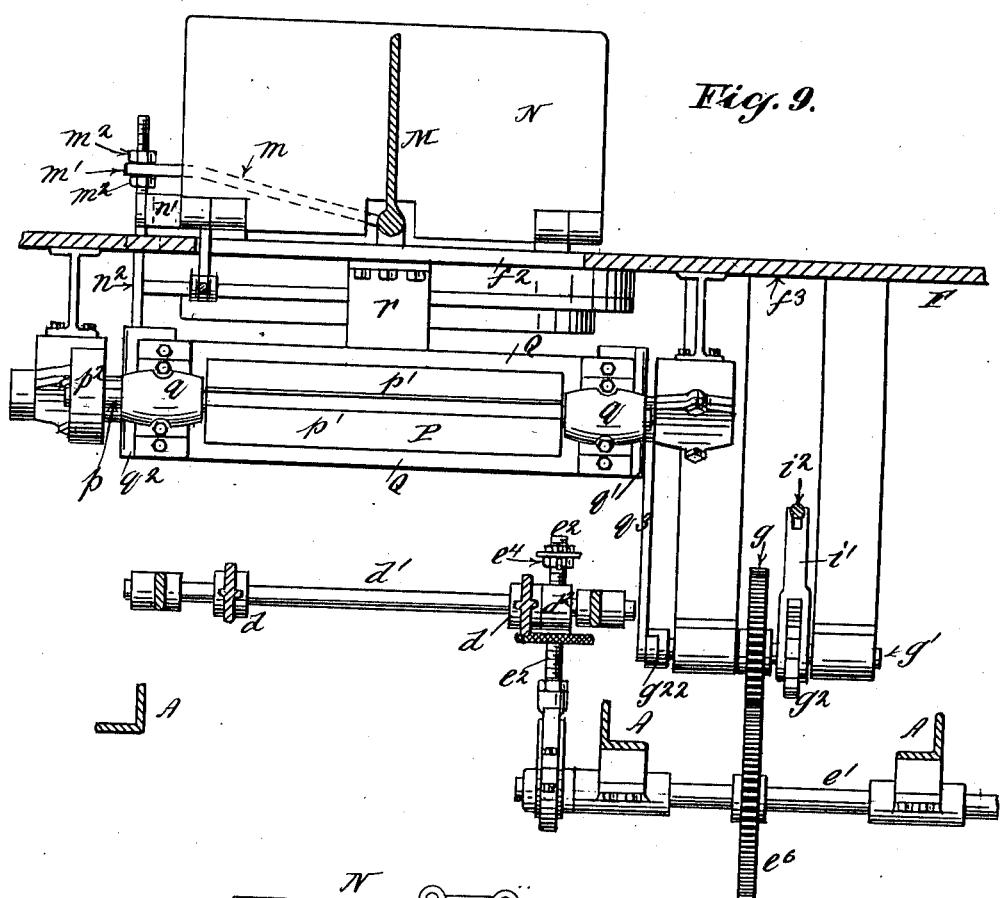
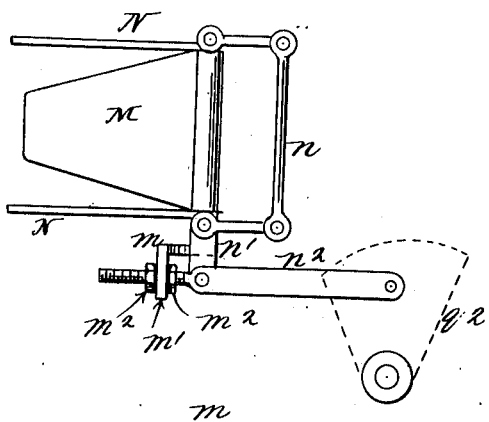
Witnesses:
Inventor:
George Dinkel
By his Attorney G. DINKEL.
AUTOMATIC FUEL FEED MECHANISM FOR FURNACES.
APPLICATION FILED NOV. 9, 1908.
970,432.
Patented Sept. 13, 1910.
7 SHEETS—SHEET 7.

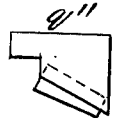
Fig.13. 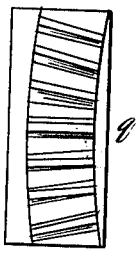 Fig.14. 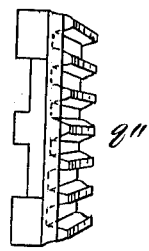 Fig.15.
Fig.16. Fig.17. Fig.18.
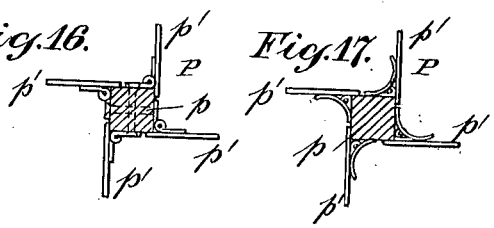

Witnesses.
D. W. Gardner.
G. W. Hopkins
Inventor:
George Dinkel
By his Attorney
Geo. Wm. Miatt

UNITED STATES PATENT OFFICE.

GEORGE DINKEL, OF JERSEY CITY, NEW JERSEY.

AUTOMATIC FUEL-FEED MECHANISM FOR FURNACES.

970,432.   Specification of Letters Patent.   Patented Sept. 13, 1910.

Application filed November 9, 1908.  Serial No. 461,616.

*To all whom it may concern:*

Be it known that I, GEORGE DINKEL, a citizen of the United States, residing in Jersey City, Hudson county, and State of New Jersey, have invented certain new and useful Improvements in Automatic Fuel-Feed Mechanism for Furnaces, of which the following is a specification.

My invention relates to the automatic feeding of coal to a furnace of any kind, more particularly to the feeding of culm, small anthracite and bituminous coal to steam boiler furnaces.

A distinguishing feature is the use of a coal propeller consisting essentially of a rotating shaft carrying beaters by which the fuel is precipitated into the furnace through a suitable feed opening; and also in imparting to said feed propeller an oscillating gyratory motion by which the fuel is distributed evenly and uniformly over the length and breadth of the grate area.

My invention also includes the use of certain deflectors in conjunction with the fuel propeller; and in certain other features in the construction and arrangement of parts hereinafter described and claimed specifically.

Figure 1:
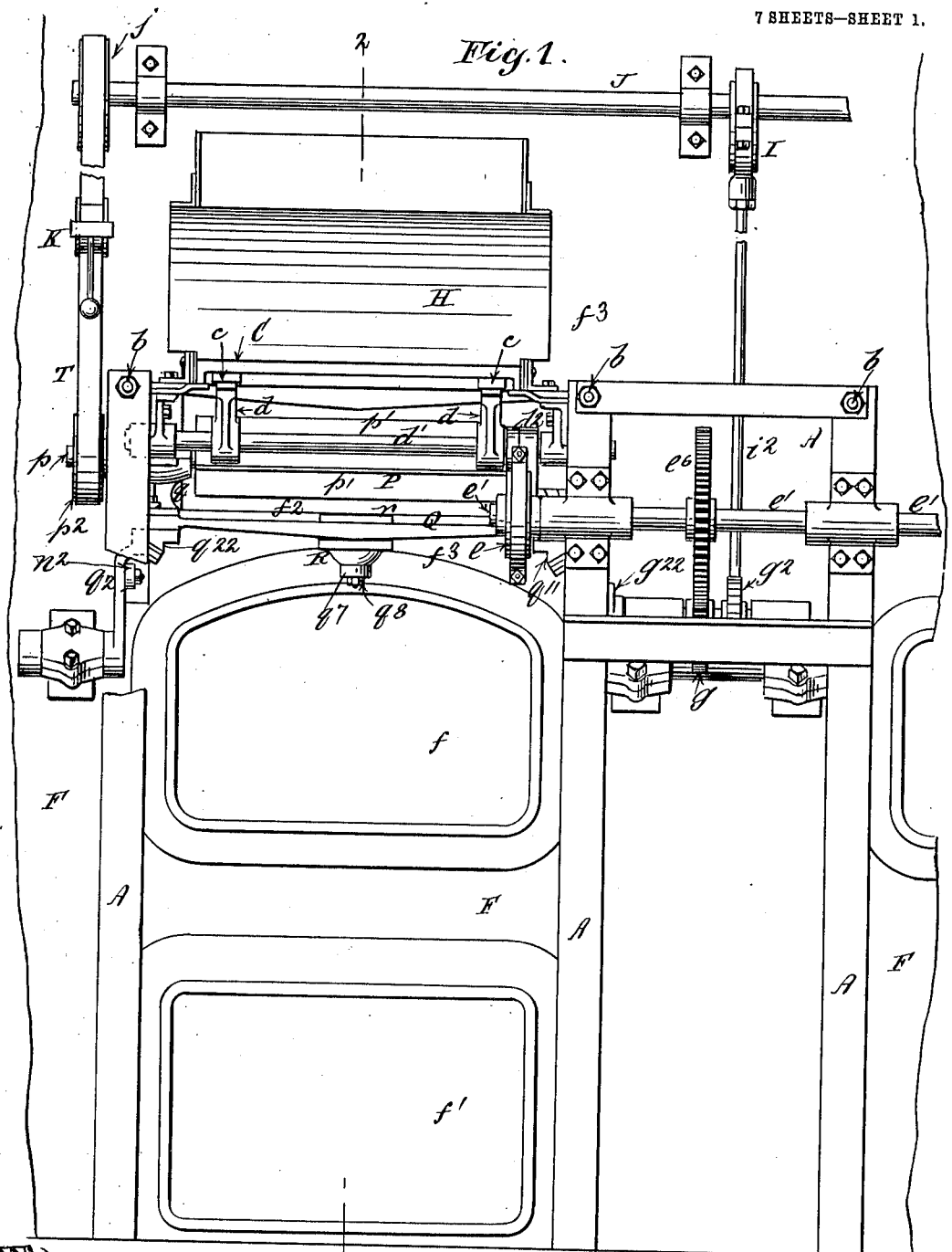
Figure 2:
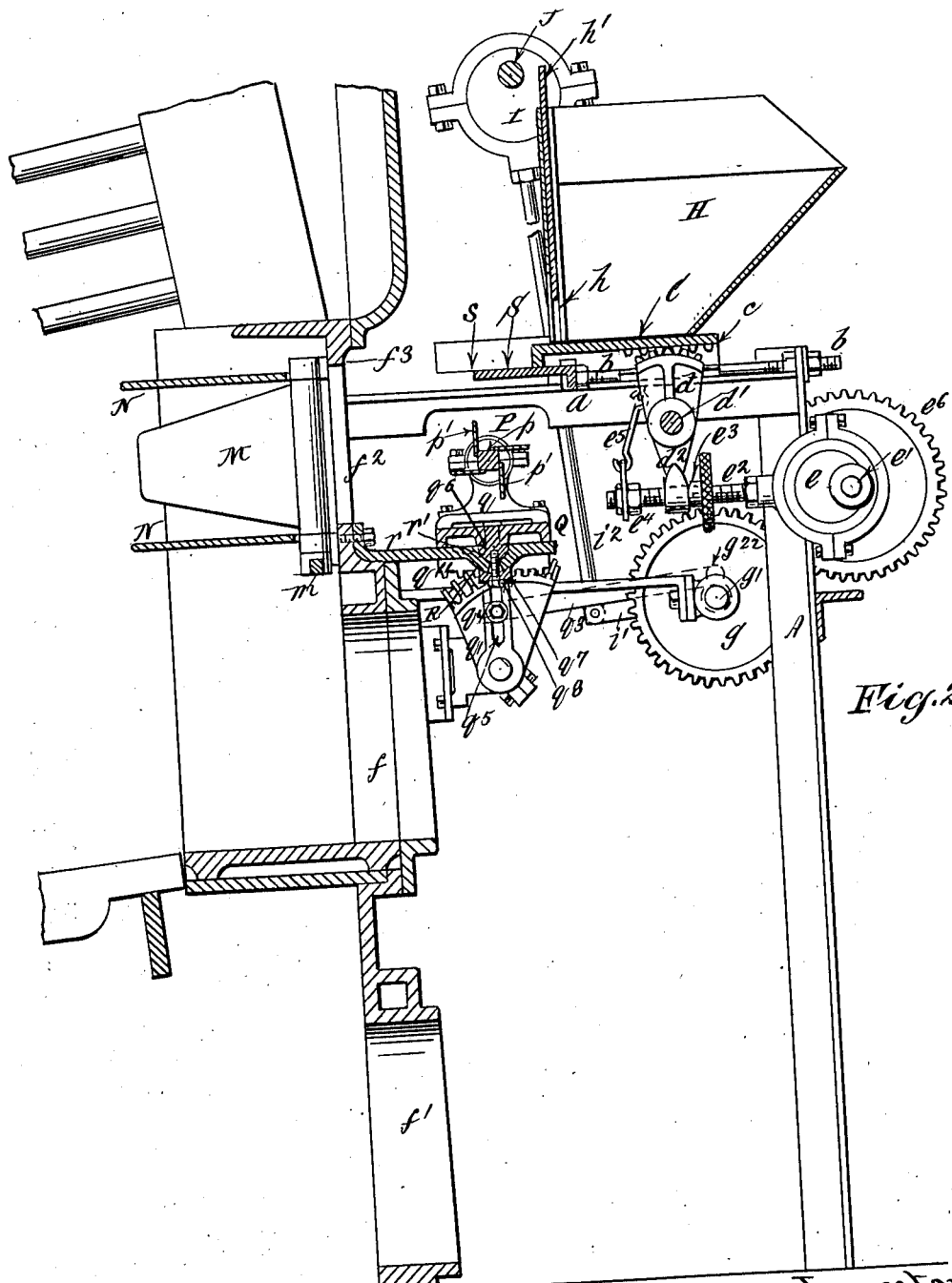
Figure 11:
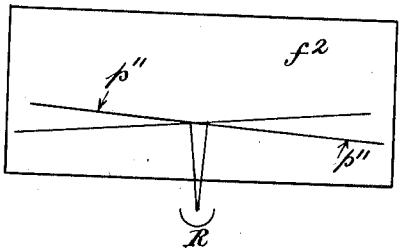
Figure 12:
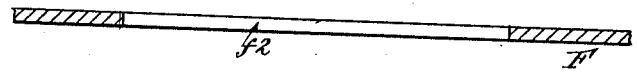
Figure 19:
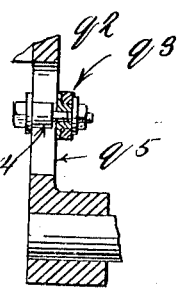

In the accompanying drawings, Figure 1, is an elevation of my improved feed mechanism arranged in relation to a boiler furnace; Fig. 2, is a vertical sectional elevation upon the plane of line 2—2— Fig. 1; Fig. 3, is an elevation taken on the right hand side of the feed mechanism and showing only the outline of the boiler; Fig. 4, is an elevation taken on the left hand side of the feed mechanism; Fig. 5, is a horizontal section taken upon the plane of line 5—5— Fig. 3; Fig. 6, is an elevation of the coal propeller and supports; Fig. 7, is an elevation upon an enlarged scale of the inner face of the right hand side segmental gear for the coal propeller; Fig. 8, is a section upon the plane of line 8—8— Fig. 7; Fig. 9, is a section upon the plane of line 9—9— Fig. 3; Fig. 10, is a side elevation of the deflecting mechanism; Fig. 11, is a diagram illustrating the axial vertical vibration of the coal propeller; Fig. 12, is a diagram illustrating the axial vibration of the coal propeller in a horizontal direction, and its relation to the furnace opening and coal feed; Figs. 13, 14 and 15, are detail views of one of the coal propeller racks; Fig. 16, is a cross section of the coal propeller provided with hinged beaters; Fig. 17, is a similar view showing the beaters provided with springs; Fig. 18, is a detail view upon an enlarged scale of the spring pawl and ratchet; Fig. 19, is a detail sectional elevation upon an enlarged scale of the wrist pin and connections; Fig. 20, is an end elevation of the bifurcated connecting rod.

F, represents a boiler furnace of ordinary construction, provided with the usual furnace door opening $f$, and ash pit opening $f'$. In addition to these the front of the furnace is formed with a feed opening $f^2$, through which the fuel is introduced into the furnace by my fuel propeller P. This propeller consists essentially of a rotatable shaft $p$, carrying a series of beaters $p'$, by which the fuel, as it drops from the feed above is precipitated into the furnace through the opening $f^2$. The direction of rotation of the fuel propeller P, referring to Fig. 2, is upward from right to left.

H, is a hopper for containing the supply of fuel, such as culm, fine bituminous or other forms of small coal. The feed opening $h$, is controlled by a slide $h'$, the fuel descending through the opening $h$, to the shelf S. This shelf S, is situated above the propeller P, and is adjustable with relation thereto upon the horizontal members $a$, of the framework A, by means of adjusting rods $b$, or other mechanical expedient. Thus the front edge $s$, of the shelf S, may be advanced or retracted with relation to the axis of the propeller shaft $p$, below.

C, is a fuel forwarder by which the coal is advanced on the shelf S. This forwarder C, constitutes the bottom of the hopper H, and is provided on its underside with rack teeth $c$, which mesh with the teeth on the segments $d$, on the rock shaft $d'$. The rock shaft $d'$, is rocked indirectly by an eccentric $e$, on the shaft $e'$,—the eccentric rod $e^2$, being formed with adjustable shoulders $e^3$, and $e^4$, which act against an arm $d^2$, on the rock shaft $d'$. In the drawings this is shown as accomplished by threading the eccentric rod $e^2$, and making the shoulders $e^3$ $e^4$, in the form of nuts which are adjustable thereon. The eccentric rod $e^2$, passes through a loop or eye in the arm $d^2$, of the rock shaft $d'$, and its inner end is supported by a flexible suspender $e^5$, as will be seen more particularly by reference to Fig. 2.

The eccentric shaft $e'$, carries a gear $e^6$, which meshes with a corresponding gear $g$, on the shaft $g'$. This shaft $g'$, also carries a ratchet wheel $g^2$, with which engages the spring pawl $i$, (shown in detail in Fig. 18), it being mounted upon the pawl arm $i'$. The latter is pivotally attached to and actuated by the eccentric rod $i^2$, connected with the eccentric I, upon the power shaft J.

It will be seen that the motion of the forwarder C, is intermittent; and that the extent of forward thrust may be regulated by the position of the nut $e^4$, on the eccentric rod $e^2$. The forwarder C is used to insure a positive though intermittent feed of fuel to the propeller P.

I oscillate the propeller P longitudinally on a central fulcrum in such manner that its ends are alternately advanced and retracted with relation to the furnace opening, as well as raised and lowered, so that the fuel is distributed over a wide area within the furnace.

The motion imparted to the fuel propeller is essentially an oscillating motion in two planes, the planes being at right angles to each other. In other words the propeller oscillates in a vertical plane and at the same time oscillates in a horizontal plane above a common center. This I accomplish by mounting the shaft $p$, upon bearings $q$, $q$, supported on a platform Q, mounted upon a central fulcrum R, preferably consisting of a ball and socket or so called universal joint, and by supporting the ends of the platform Q, upon segmental cam gears $q'$, $q^2$. These segmental gears $q'$, $q^2$, are opposed to each other in eccentricity, but otherwise duplicates in so far as their thrust and travel is concerned. They engage with racks $q''$, and $q^{22}$, on the underside of the platform Q, and are actuated by a rod $q^3$, pivotally connected with the segmental cam gear $q'$, the motion being transmitted to the platform Q, to the opposed segmental cam gear $q^2$. The connecting rod $q^3$, is reciprocated so as to rock the segmental cam gears $q'$, $q^2$, by means of a pivotal connection with the crank $g^{22}$ on the ratchet shaft $g'$.

In order to regulate and vary the extent of motion of the segmental cam gears $q'$, $q^2$, (which may be designated as rockers) I mount the wrist block $q^4$, adjustably in a radial slot $q^5$, in the segmental gear $q'$, as will be understood by reference to Fig. 19,—it being obvious that as the wrist pin is adjusted to or from the fulcrum of said gear, the throw of the gear will be increased or diminished.

The segmental cam gears being arranged in opposition to each other and working in unison, raise one end of the platform while advancing it toward the fuel feed opening, and lower the other end of the platform while detracting it from said furnace feed opening. As a result an oscillating gyratory motion is imparted to each end of the propeller with the center of its longitudinal axis, as the center of vibration.

I do not limit myself to the particular form of fulcrum or pivotal support for the frame Q, the only essential feature in this respect, being a bearing that will permit the frame Q, to rock freely under the action of the segmental cam gears.

In the construction shown in the drawings, the bracket $r$, is rigidly secured to the front of the furnace plate, and is formed with a hemispherical socket $r'$, in which rests the hemispherical bearing $q^6$, attached centrally to the underside of the frame Q. The bearing $q^6$, is retained in its seat $r'$, by means of a concave follower $q^7$, fitting and sliding over the convex under surface of the socket $r'$, and attached to the hemispherical bearing by a screw $q^8$, passing through it and through a conical opening in the bottom of said socket as shown in Fig. 2.

The propeller P, is driven by any means that may be found most expedient. In the drawings it is shown as driven by a belt T, passing over the pulley $p^2$, on one end of the shaft $p$, and over a driving pulley $j$, on the power shaft J. A belt tightening device K, of any desired construction is arranged to bear upon the belt T, to compensate for the orbitary motion of the pulley $p^2$, on the shaft $p$, and keep the belt taut. An arrangement of this kind is shown by way of illustration in Figs. 1 and 4.

The gyratory motion imparted to the propeller P, causes its beaters $p'$, to precipitate the fuel in showers which travel alternately up and down and back and forth from side to side, and lengthwise over the grate area, the end of the propeller raised throwing the fuel obliquely toward the opposite side of the furnace at an elevation so as to reach the farthest extent of the grate area, while the depressed side of the propeller throws the fuel diagonally across the furnace grate toward the other side thereof, at a lower level and covering the front portion of the grate, and this action alternates from one side to the other as the propeller gyrates on its central support, tending to distribute the fuel evenly and uniformly over the whole furnace area.

The adjustment of the feed with relation to the axis of the propeller P, is important in that it determines and regulates the force of impact and consequently the impetus imparted to the fuel,—an essential feature when dealing with different sizes and grades of coal.

For the protection of the beaters $p'$, they are preferably hinged or loosely attached to the shaft $p$, and in action are extended radially by centrifugal force as illustrated in Figs. 16 and 17. This allows them to yield temporarily if a piece of coal of extra size or weight is encountered. In some cases they may be backed by spring pressure if desired, as illustrated in Fig. 17. In either case the centrifugal force imparted to them is sufficient to precipitate the particles of fuel under treatment if of approximately uniform size or grade.

In the accompanying drawings, for convenience of illustration, the propeller P is shown in intermediate or horizontal position, except in the diagrams, Figs. 11 and 12, in which the letter $p''$, $p''$, represents the longitudinal axis of the propeller P in its extremes of oscillation.

In burning bituminous or some other grades of coal, it is desirable to have a sufficiently intense heat in the furnace to burn off the volatile matter or gases as fast as they are distilled off from the fuel, and to accomplish this the incandescence of a portion of the fuel on the grate is desirable. In order to effect and control this result with accuracy, I provide horizontal deflectors N, which may be used not only in distributing the fuel uniformly over the whole length of grate when desired, but may also be set to deliver the coal to either the front or the rear portion thereof,—the fuel on the other portion of the grate in the mean time being maintained in an incandescent state, for the purpose above stated. Thus alternate sections of the fuel on the grate may be replenished while the other portion furnishes the requisite heat to insure the combustion of the gaseous products given off by the fresh fuel; and by this method, smoke may be eliminated and the full value of fuel utilized. I also provide a vertical deflector M, arranged centrally in the furnace feed opening $f^2$, which may be controlled manually if desired, to divert the path of a portion of the fuel to one side or the other of the furnace. These deflectors may be actuated automatically if desired by motion borrowed from an operative part of the mechanism. In the arrangement shown in the drawings, the deflectors are situated just inside the fuel feed opening $f^2$, being mounted pivotally on the front plate $f$, of the furnace. In this case the vertical deflector M, converges inwardly to admit of the play of the horizontal deflectors N, which are coupled together by a pivotal link $n$. A crank arm $n'$, connects them pivotally with a connecting rod $n^2$, pivotally connected at its other end to the segmental cam gear $q^2$, so that the deflectors N, are rocked in unison with the motion of the propeller P. The central vertical deflector M, may be actuated automatically by the same movement, by providing it with a rocker arm $m$, having a bifurcated end $m'$, which straddles a threaded extension of the link $n^2$, on which are adjustable bearing nuts $m^2$, $m^2$, by which the deflector M, may be adjusted either to the right or to the left as may be found most expedient. This central deflector M, may be actuated independently of the other deflectors N, if desired; and I do not therefore limit myself to the specific mechanism herein shown for controlling the deflectors, since other mechanical expedients may be resorted to without departing from the spirit and intent of my invention.

It is to be understood that the fuel feeding mechanism herein set forth, is to be duplicated for each furnace opening; and that a series of them may be arranged in conjunction and operated by a single power shaft.

Furthermore my automatic fuel feed mechanism is so arranged and placed as not to interfere with the firing of the furnace in the ordinary manner when desired.

What I claim as my invention and desire to secure by Letters Patent is,

1. In combination with a furnace having a fuel feed opening, a fuel propeller arranged to precipitate fuel through said opening consisting of a rotatable shaft provided with beaters for impact with the fuel, means for rotating said shaft, means for imparting to said propeller an oscillatory motion in two planes at right angles to each other, and fuel feed mechanism arranged above said propeller, for the purpose described.

2. In combination with a furnace having a fuel opening a fuel propeller arranged to precipitate fuel through said opening consisting of a rotatable shaft provided with beaters for impact with the fuel, a vibratory platform on which said propeller shaft is mounted, a ball and socket bearing supporting said shaft centrally, means for imparting to said platform an oscillatory motion in two planes at right angles to each other, means for rotating said shaft on its longitudinal axis, and means for feeding fuel to said propeller, for the purpose described.

3. In combination with a furnace having a fuel feed opening, a fuel propeller arranged to precipitate fuel through said opening consisting of a rotatable shaft provided with beaters for impact with the fuel, a vibratory platform on which said shaft is mounted, a central supporting pivot for said platform, racks on said platform, segmental cam gears engaging said racks, means for actuating said segmental gears to impart to said platform an oscillatory motion in two planes at right angles to each other, means for rotating said propeller shaft, and fuel feed mechanism above said propeller, for the purpose described.

4. In combination with a furnace having a fuel feed opening, a fuel propeller arranged to precipitate fuel through said opening consisting of a rotatable shaft provided with beaters for impact with the fuel, means for rotating said shaft, means for imparting to said propeller an oscillatory motion in two planes at right angles to each other, fuel feed mechanism arranged above said propeller, and means for adjusting the fuel feed with relation to the longitudinal axis of said propeller, for the purpose described.

5. In combination with a furnace having a fuel feed opening, a fuel propeller arranged to precipitate fuel through said opening consisting of a rotatable shaft provided with beaters for impact with the fuel, means for rotating said shaft, means for imparting to said propeller an oscillatory motion in two planes at right angles to each other, fuel feed mechanism arranged above said propeller, and means for positively advancing the feed of fuel to said propeller, for the purpose described.

6. In combination with a furnace having a fuel feed opening, a fuel propeller arranged to precipitate fuel through said opening consisting of a rotatable shaft provided with beaters for impact with the fuel, means for rotating said shaft, means for imparting to said propeller an oscillatory motion in two planes at right angles to each other, fuel feed mechanism arranged above said propeller, means for adjusting the fuel feed with relation to the longitudinal axis of said propeller, and means for positively forwarding the fuel feed, for the purpose described.

7. In combination with a furnace having a fuel feed opening, a fuel propeller arranged to precipitate fuel through said opening consisting of a rotatable shaft provided with beaters for impact with the fuel, said beaters being hinged to said shaft, means for rotating said shaft, means for imparting to said propeller an oscillatory motion in two planes at right angles to each other, and fuel feed mechanism arranged above said propeller, for the purpose described.

8. In combination with a furnace having a fuel feed opening, a fuel propeller arranged to precipitate fuel through said opening consisting of a rotatable shaft provided with beaters for impact with the fuel, said beaters being hinged to said shaft, springs mounted upon said shaft and bearing upon said beaters, means for rotating said shaft, means for imparting to said propeller an oscillatory motion in two planes at right angles to each other, and fuel feed mechanism arranged above said propeller, for the purpose described.

9. The combination with a furnace having a fuel feed opening, a vertical deflector arranged within said fuel feed opening, means for operating said deflector, a fuel propeller arranged to precipitate fuel through said opening consisting of a rotatable shaft provided with beaters for impact with the fuel, means for rotating said shaft, means for imparting to said propeller an oscillatory motion in two planes at right angles to each other, and fuel feed mechanism arranged above said propeller, for the purpose described.

10. The combination with a furnace having a fuel feed opening, a pair of horizontal deflectors arranged within said furnace feed opening, one near the top and one near the bottom thereof, and means for operating said deflectors simultaneously, a fuel propeller arranged to precipitate fuel through said opening consisting of a rotatable shaft provided with beaters for impact with the fuel, means for rotating said shaft, means for imparting to said propeller an oscillatory motion in two planes at right angles to each other, and fuel feed mechanism arranged above said propeller, for the purpose described.

11. The combination with a furnace having a fuel feed opening, a pair of horizontal deflectors arranged within said furnace opening, one near the top and the other near the bottom thereof, a central vertical deflector arranged within said furnace feed opening, and between said horizontal deflectors, means for operating said deflectors, a fuel propeller arranged to precipitate fuel through said opening consisting of a rotatable shaft provided with beaters for impact with the fuel, means for rotating said shaft, means for imparting to said propeller an oscillatory motion in two planes at right angles to each other, and fuel feed mechanism arranged above said propeller, for the purpose described.

12. In combination with a furnace having a fuel feed opening, a fuel propeller arranged to precipitate fuel through said opening consisting of a rotatable shaft provided with beaters for impact with the fuel, means for rotating said shaft, means for imparting to said propeller an oscillatory motion in two planes at right angles to each other, means for regulating the thrust of said fuel propeller with relation to the furnace fuel opening, and fuel feed mechanism arranged above said propeller, for the purpose described.

13. The combination of a furnace formed with a fuel opening, a rotatable fuel propeller shaft provided with beaters and arranged to precipitate fuel through said fuel feed opening, means for rotating said fuel propeller shaft, means for imparting to said propeller shaft an oscillatory motion in two planes at right angles to each other, fuel feed mechanism arranged to deposit fuel on a fuel feed shelf above said fuel propeller shaft, said feed shelf interposed between the fuel feed mechanism and the said fuel propeller and arranged to control the delivery of fuel to the latter, means for adjusting said fuel feed shelf with relation to the axis of the fuel propeller, a pair of parallel horizontal deflectors in said furnace fuel opening, one near the top and the other near the bottom thereof, and means for adjusting the inclination of said horizontal deflectors vertically while maintaining their parallelism, whereby the delivery of fuel to the furnace may be raised or lowered, for the purpose described.

GEORGE DINKEL.

Witnesses:
 GEO. WM. MIATT,
 D. W. GARDNER.